(12) United States Patent
Okada et al.

(10) Patent No.: US 7,404,602 B2
(45) Date of Patent: Jul. 29, 2008

(54) VEHICLE SEAT APPARATUS

(75) Inventors: Masaki Okada, Yokkaichi (JP); Yoshitaka Koga, Chiryu (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 445 days.

(21) Appl. No.: 11/266,238

(22) Filed: Nov. 4, 2005

(65) Prior Publication Data

US 2006/0091711 A1   May 4, 2006

(30) Foreign Application Priority Data

Nov. 4, 2004   (JP)  .............................. 2004-320031

(51) Int. Cl.
 *A47C 7/14*   (2006.01)
(52) U.S. Cl. ............................... 297/284.11; 297/216.1
(58) Field of Classification Search ............ 297/284.11, 297/216.1
See application file for complete search history.

(56) References Cited

U.S. PATENT DOCUMENTS

| | | | | |
|---|---|---|---|---|
| 4,589,696 A | * | 5/1986 | Kanai et al. ............ | 297/284.11 |
| 4,693,513 A | * | 9/1987 | Heath .................... | 297/284.11 |
| 4,753,479 A | * | 6/1988 | Hatsutta et al. ........ | 297/284.11 |
| 5,908,220 A | * | 6/1999 | Bauer et al. ............ | 297/284.1 |
| 6,386,631 B1 | * | 5/2002 | Masuda et al. .......... | 297/216.1 |
| 6,435,610 B2 | * | 8/2002 | Kondo et al. ........... | 297/284.11 |
| 6,450,573 B1 | * | 9/2002 | Yamaguchi et al. ...... | 297/216.1 |
| 6,604,599 B2 | * | 8/2003 | Yamaguchi et al. ......... | 180/271 |
| 6,755,465 B2 | * | 6/2004 | Yamaguchi et al. ...... | 297/216.1 |
| 6,814,406 B2 | * | 11/2004 | Ito et al. ................. | 297/284.11 |
| 6,837,540 B2 | * | 1/2005 | Yamaguchi et al. ...... | 297/216.1 |
| 6,921,133 B2 | * | 7/2005 | Taoka et al. ............ | 297/216.16 |
| 2007/0132286 A1 | * | 6/2007 | Taoka et al. ............ | 297/216.1 |

FOREIGN PATENT DOCUMENTS

| | | | | |
|---|---|---|---|---|
| FR | 2562003 A1 | * | 10/1985 | ............ 297/284.11 |
| JP | 2004-155341 | | 6/2004 | |

\* cited by examiner

*Primary Examiner*—Rodney B. White
(74) *Attorney, Agent, or Firm*—Finnegan, Henderson, Farabow, Garrett & Dunner, LLP

(57) ABSTRACT

A vehicle seat apparatus including a cushion body provided on a frame member, a seat cushion, a gear member, a driving mechanism, an arm, and a link mechanism having a first bracket rotatably supported at the gear member, a second bracket rotatably supported at the first bracket, and a link bracket, a first end of which is rotatably supported at the second bracket, and a second end of which is connected to the arm. The arm is connected to the gear member through the link mechanism, and with an up-and-down operation of a front-end portion of the cushion body relative to the frame member by means of a swing of the arm, a length of the seating surface is variable in a longitudinal direction.

12 Claims, 5 Drawing Sheets

VEHICLE SEAT APPARATUS

This application is on the basis of and claims priority under 35 U.S.C. § 119 to Japanese Patent Application 2004-320031, filed on Nov. 4, 2004, the entire content of which is incorporated herein by reference.

FIELD OF THE INVENTION

This invention relates to a vehicle seat apparatus capable of varying a length of a seating surface of a seat cushion.

BACKGROUND

A known seat apparatus is disclosed in JP2004155341A. This seat apparatus includes a frame member, a cushion body provided on the frame member, and a seat cushion, a seating surface of which is formed by the cushion body. The seat apparatus further includes a gear member, a driving mechanism and an arm. The gear member is rotatably supported at the frame member. The driving mechanism is supported at the frame member and, in order to rotate the gear member, connected to the gear member. The arm is swingably supported at the frame member, connected to a front-end portion of the cushion body and, through a link mechanism, connected to the gear member. As a result of the rotation of the gear member by means of an operation of the driving mechanism, the seat apparatus swings the arm thorough the link mechanism and, by operating the front-end portion of the cushion body upwards and downwards relative to the frame member, the seat apparatus varies a length of the seating surface.

The link mechanism includes a drive link and a driven link. A first end of the drive link is rotatably supported at the gear member through an elongated hole extended in a width direction of the drive link. A first end of the driven link is fixed to the arm, and a second end of which is supported at a second end of the drive link and is rotatable around a shaft extending in a width direction of the driven link. With the configuration of the aforementioned seat apparatus, in order to vary the length of the seating surface of the seat cushion, the arm is swung by operating the drive link and driven link in a longitudinal direction of the seat by means of rotation of the gear member. On such occasions, because of rotation of the driven link relative to the drive link, the driven link is made to follow a swing of the arm, and, because of a movement of the drive link relative to the gear member along the elongated hole, a locus error between a rotation locus of the gear member and a movement locus of the drive link is absorbed.

However, with the configuration of the aforementioned seat apparatus, in a condition where the length of the seating surface of the seat cushion is varied, in other words, in a condition where, in order to swing the arm, by means of the rotation of the gear member, the driven link and the drive link are moved in a longitudinal direction of the seat, a relative position between a fixed point of the first end of the driven link relative to the arm and a bearing point of the first end of the drive link relative to the gear member slips in a width direction, and distortions in the drive link and the driven link may on occasions be generated. Although such distortions are absorbed, to some degree, by means of looseness in terms of structural measurements at the fixed point of the first end of the driven link relative to the arm, the distortions and the looseness tend to interrupt a smooth swing of the arm. Moreover, the more that the assembling accuracy of the driven link at the fixed point of the first end of the driven link relative to the arm is enhanced, the greater the degree to which the swing of the arm itself is interrupted.

A need thus exists for a seating apparatus, which secures a reliable and smooth swing of an arm.

SUMMARY OF THE INVENTION

According to an aspect of the present invention, a vehicle seat apparatus including a cushion body provided on a frame member, a seat cushion, a gear member, a driving mechanism, an arm, and a link mechanism having a first bracket rotatably supported at the gear member, a second bracket rotatably supported at the first bracket, and a link bracket, a first end of which is rotatably supported at the second bracket, and a second end of which is connected to the arm. The arm is connected to the gear member through the link mechanism, and with an up-and-down operation of a front-end portion of the cushion body relative to the frame member by means of a swing of the arm, a length of the seating surface is variable in a longitudinal direction.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
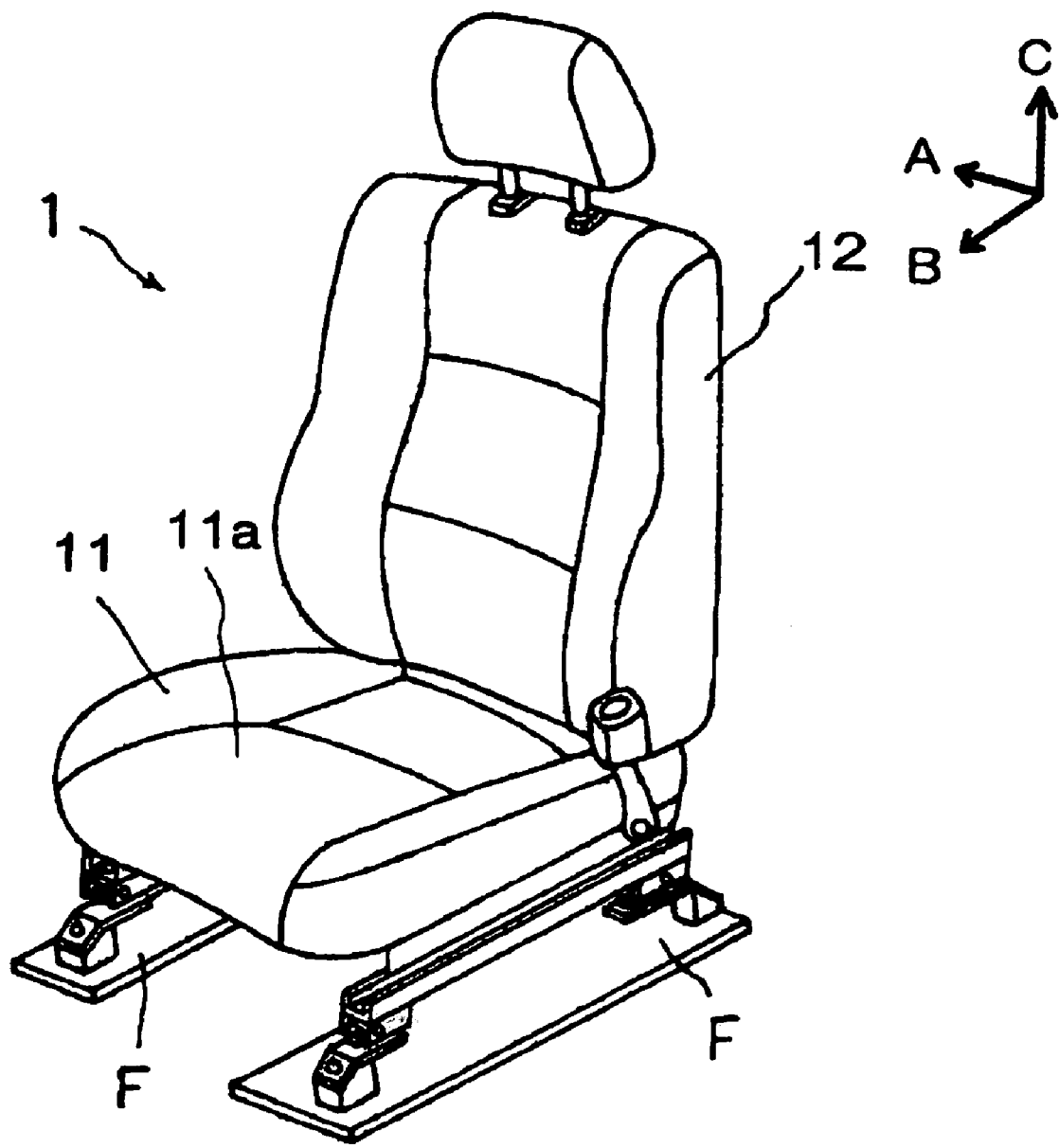
FIG. 1 is a perspective view illustrating a vehicle seat apparatus according to an embodiment of the present invention.
Figure 2:
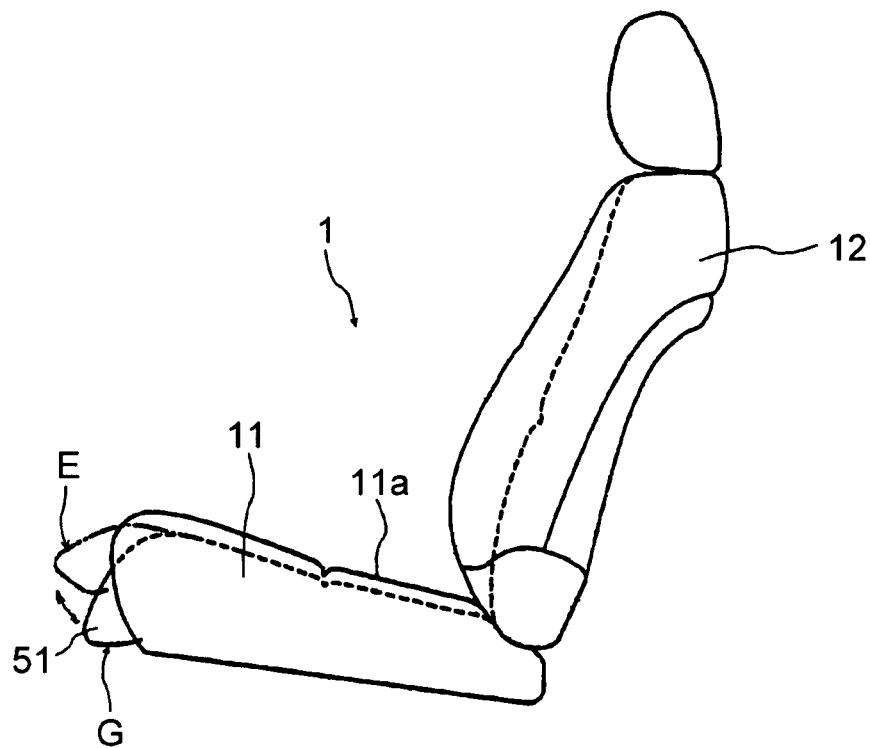
FIG. 2 is a perspective side view illustrating the vehicle seat apparatus.

An embodiment of the present invention will be explained hereinbelow with reference to the attached drawings. As illustrated in FIGS. 1-2, a vehicle seat 1 includes a seat cushion 11 and a seatback 12.

Figure 3:
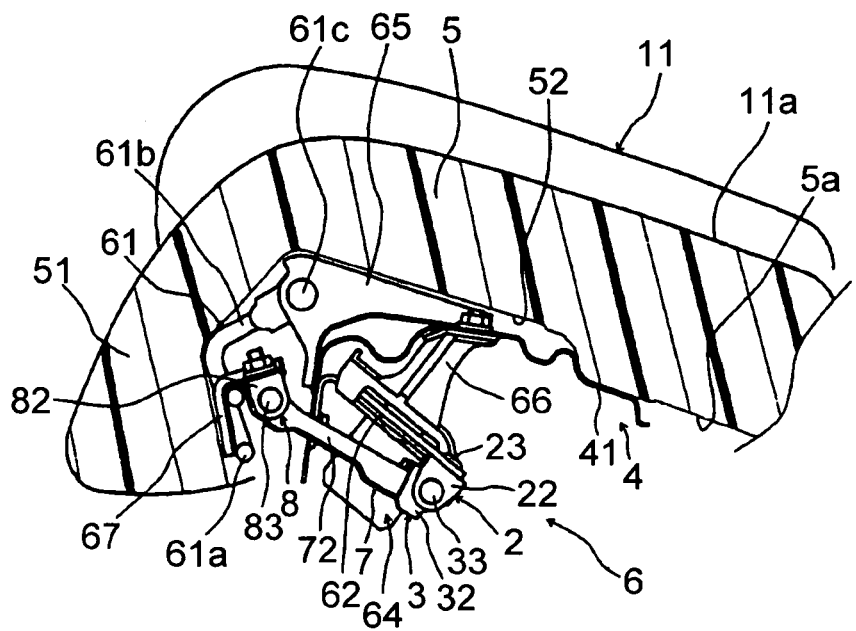
FIG. 3 is a cross-sectional view illustrating a front-edge portion of a seat cushion of the vehicle seat apparatus.

The seat cushion 11, of rectangular shape, and extending in a width direction (i.e., A direction as viewed in FIG. 1) and a longitudinal direction (i.e., B direction as viewed in FIG. 1) of the seat 1, is provided on a floor F of a vehicle. As illustrated in FIG. 3, this seat cushion 11 includes a frame 4 serving as a skeleton of the seat cushion 11, and a cushion body 5 which, by forming a seating surface 11a of the seat cushion 11, forms the seat cushion 11. The seatback 12, of rectangular shape, and extending in the width direction and a height direction (i.e., C direction as viewed in FIG. 1) of the seat 1, is provided on the seat cushion 11 along a rear-edge portion of the seat cushion 11. This seatback 12, like the seat cushion 11, includes a frame and a cushion body.

According to the embodiment of the present invention, with the variation of a shape of a front-edge portion of the seat cushion 11, the seat 1 can vary a length of the seating surface 11a of the seat cushion 11, by means of a varying mechanism 6 which will be described hereinafter.

Figure 4:
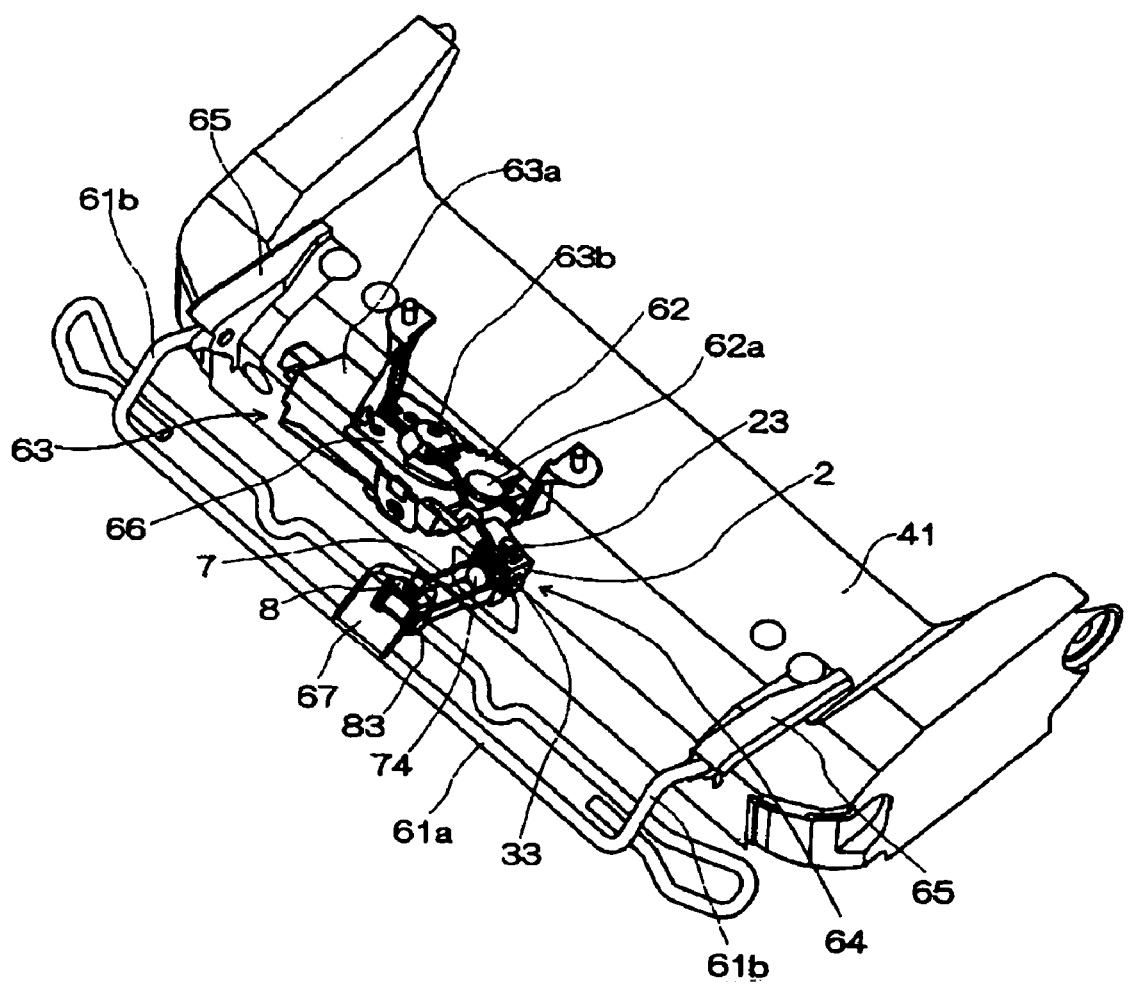
FIG. 4 is a perspective view illustrating a varying mechanism of the vehicle seat apparatus.

The varying mechanism 6 will be explained with reference to FIGS. 3-5.

The varying mechanism 6 includes an arm 61, a sector gear 62, a driving mechanism 63, and a link mechanism 64. The cushion body 5 is provided, at an inner surface 5a, with a recess portion 52, in which the varying mechanism 6 is housed, and the recess portion is positioned at a front-end portion 51 of the cushion body 5. The frame 4 includes a front panel 41 that is arranged so as to cover up the recess portion 52. A, right and left, pair of supporting brackets 65 is fixed at an upper surface of the front panel 41 facing the inner surface 5a of the cushion body 5, and a base bracket 66 is fixed at a downside surface of the front panel 41.

The arm 61 is provided in the recess portion 52 and extended, along a front-edge of the front panel 41, in the A direction shown in FIG. 1. The arm 61 includes a movable portion 61a having a substantially rod shape at a first end, and includes a supporting portion 61b at a second end. The arm 61 is extended from the movable portion 61a and flexed along the seat 1 in a rear direction of the seat 1, and by means of a pin 61c, the arm 61 is swingably supported by the supporting bracket 65 at the supporting portion 61b. The movable portion 61a of the arm 61 contacts the inner surface 5a of the cushion body 5, and supports the front-end portion 51 of the cushion body 5, and the arm 61 is thereby connected to the front-end portion 51 of the cushion body 5. With the configuration of the seat apparatus according to the embodiment of the present invention, when the arm 61 swings, as a result of the pushing and pulling of the front-end portion 51 of the cushion body 5, the movable portion 61a operates the front-end portion 51 upwards and downwards relative to the front panel 41. Thereby, a shape of the front-edge portion of the seat cushion 11 can be varied, and thus, the length of the seating surface 11a of the seat cushion 11 can be varied. A supporting bracket 67 is fixed at a center portion of the movable portion 61a of the arm 61 in the A direction.

The sector gear 62 is rotatably supported at the base bracket 66 by means of a pin 62a. The sector gear 62 is integrally provided with a gear tooth portion 62b at a first end and is integrally provided with an arm portion 62c at a second end. The pin 62a is positioned between the gear tooth portion 62b and the arm portion 62c.

The driving mechanism 63, which is attached to the base bracket 66, includes an electric motor 63a serving as a driving power source, and includes an output pinion provided on a supporting shaft 63b. Because the output pinion of the driving mechanism 63 is meshed with the gear tooth portion 62b of the sector gear 62, the driving mechanism 63 is connected to the sector gear 62. With the configuration of the seat apparatus according to the embodiment of the present invention, when the output pinion is rotated by an activation of the electric motor 63, the sector gear 62 is rotated by means of a gear-mesh of the output pinion and the gear tooth portion 62b of the sector gear 62.

The link mechanism 64 connects the sector gear 62 to the arm 61, transmits rotation of the sector gear 62 to the arm 61, and swings the arm 61. The link mechanism 64 includes a first bracket 2, a second bracket 3, a link bracket 7, and a third bracket 8.

The first bracket 2 being a substantially U-shaped cross section includes a base wall 21 (i.e., first base wall) and a, right and left, pair of vertical walls 22 (i.e., first vertical walls) extended from first and second ends of the base wall 21. By means of a pin 23 (i.e., first pin) extended in the C direction shown in FIG. 1, the first bracket 2 is rotatably supported at the arm portion 62c of the sector gear 62 at the base wall 21.

The second bracket 3, as well as the first bracket 2, being a substantially U-shaped cross section includes a base wall 31 (i.e., second base wall) and a, right and left, pair of vertical walls 32 (i.e., second vertical walls) extended from first and second ends of the base wall 31. By means of a pin 33 (i.e., second pin), which is provided substantially perpendicular to the pin 23 and extended in the A direction shown in FIG. 1, the second bracket 3 is rotatably supported at the vertical wall 22 of the first bracket 2 at the vertical wall 32.

The link bracket 7 being a substantially U-shaped cross section includes a base wall 71 (i.e., link base wall) and a, right and left, pair of vertical walls 72 (i.e., link vertical walls) extended from first and second ends of the base wall 71. The link bracket 7 is also of lengthy shape and its pair of vertical walls 72, each end of which is respectively connected to a bottom wall 73, is extended in the B direction shown in FIG. 1. By means of a pin 74 (i.e., link pin), which is provided so as to be substantially perpendicular to the pin 33 and extended in the B direction, the link bracket 7 is rotatably supported at the base wall 31 of the second bracket 3 at the base wall 71.

The third bracket 8, being, like the first bracket 2 and the second bracket 3, a substantially U-shaped cross section, includes a base wall 81 (i.e., third base wall) and a, right and left, pair of vertical walls 82 (i.e., third vertical walls) extended from first and second ends of the base wall 81. The third bracket 8 is fixed to the supporting bracket 67 of the arm 61, and by means of a pin 83 (i.e., third pin), which is provided so as to be substantially parallel to the pin 33 and extended in the A direction, the third bracket 8 is rotatably supported at first and second ends of the pair of vertical walls 72 of the link bracket 7. Accordingly, because the third bracket 8, at which the link bracket 7 is supported, is supported by the supporting bracket 67 fixed to the arm 61, the link bracket 7 is connected to the arm 61.

An operation of the varying mechanism 6 will now be explained.

Figure 5:
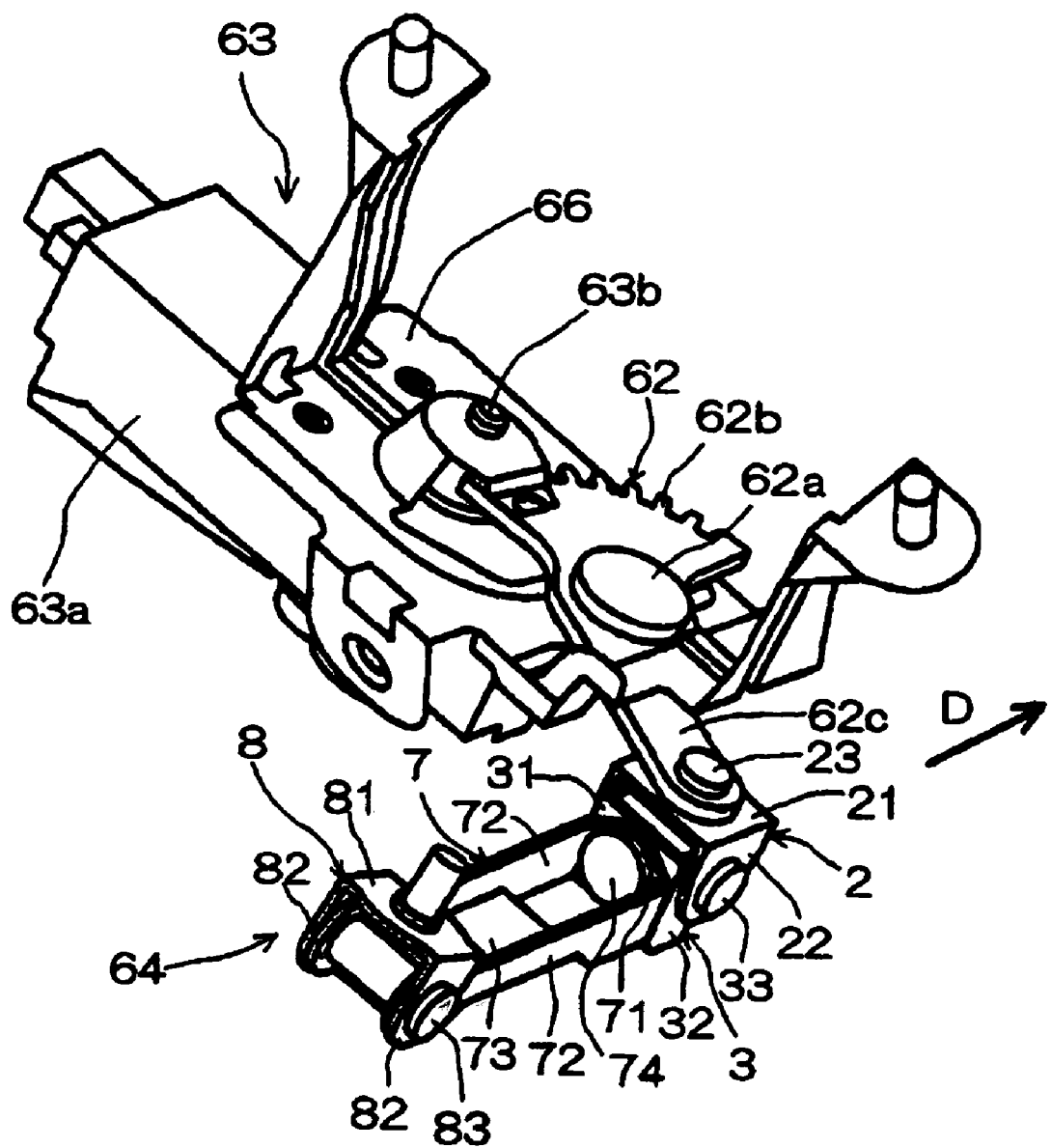
FIG. 5 is a perspective view illustrating a varying mechanism in a condition where the front-end portion of the cushion body of the seat cushion of the vehicle seat apparatus is positioned at a pull-out position.

Illustrated in FIG. 5 is a condition of the varying mechanism 6, where the front-end portion 51 of the cushion body 5 is positioned at a pull-out position E, as can be seen from a chain double-dashed line shown in FIG. 2, in other words, a condition of the varying mechanism 6 where the seating surface 11a of the seat cushion 11 is regarded as being in a longer condition. In such a condition, when the driving mechanism 63 is operated, in other words, when the output pinion is rotated by means of an activation of the electric motor 63a, the sector gear 62 is rotated in a counter-clockwise direction shown in FIG. 5, and the pin 23 rotatably moves in a direction of an arrow D shown in FIG. 5 (i.e., the rear direction of the seat 1) around the pin 62a while the sector gear 62 is rotated in the counter-clockwise direction. By means of the rotatable movement of the pin 23, through the first bracket 2 and the second bracket 3, the link bracket 7 is linearly operated in the D direction, and thereby, through the third bracket 8, the supporting bracket 67 of the arm 61 is moved in the D direction, as shown in FIG. 5. When the supporting bracket 67 moves in the D direction, the arm 61 swings in the counter-clockwise direction around the pin 61c, as shown in FIG. 3, and the front-end portion 51 of the cushion body 5 is thereby operated downwards relative to the front panel 41, and positioned at a pull-in position G, as can be seen from the solid line shown in FIG. 2. In consequence, the length of the seating surface 11a of the seat cushion 11 becomes less than in the condition where the front-end portion 51 of the cushion body 5 is positioned at a pull-out position E indicated by a chain double-dashed line shown in FIG. 2. Illustrated in FIG. 6 is a condition of the varying mechanism 6 where the front-end portion 51 of the cushion body 5 is positioned at the pull-in position G indicated by a solid line shown in FIG. 2.

Under such operations of the varying mechanism 6, a locus of a linear movement of the link bracket 7 in the D direction shown in FIG. 5 generates a locus error in the A direction relative to a locus of the rotatable movement of the pin 23 in the D direction. However, the locus error can be absorbed by means of the rotation of the first bracket 2 around the pin 23 relative to the arm portion 62c of the sector gear 62. Further, by means of the second bracket 3 rotating around the pin 33 relative to the first bracket 2, and by means of the third bracket 8 rotatable around the pin 83 relative to the link bracket 7, variations in a relative position of the supporting bracket 67 in the C direction relative to the pin 23 can be absorbed, because of the swing of the arm 61 in a clockwise direction shown in FIG. 3. Moreover, by means of the rotation of the link bracket 7 around the pin 74 relative to the second bracket 3, variations in a relative position of the supporting bracket 67 in the A direction relative to the pin 23 can be absorbed. Accordingly, when the varying mechanism 6 is operated, the link mechanism 64 absorbs looseness between the sector gear 62 and the arm 61 emanating from every direction. In other words, because the link bracket 7 moves in the D direction shown in FIG. 5 by following the rotation of the sector gear 62 in the counter-clockwise direction shown in FIG. 6 and by following the swing of the arm 61 in the clockwise direction shown in FIG. 3, problems such as torsion in the link bracket 7 do not occur and a smooth operation of the varying mechanism 6 can thereby be ensured.

Figure 6:
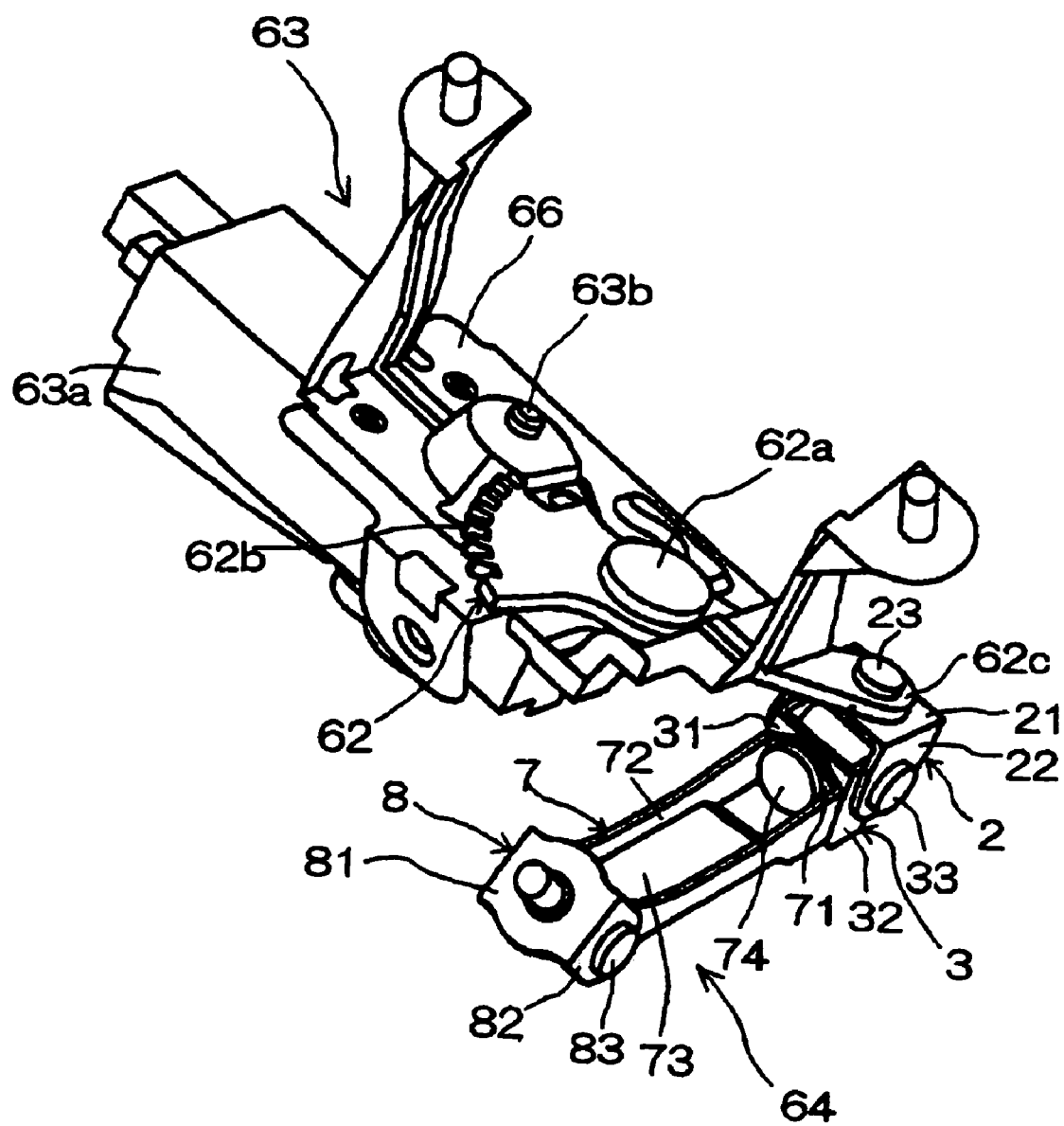
FIG. 6 is a perspective view illustrating a varying mechanism in a condition where the front-end portion of the cushion body of the seat cushion of the vehicle seat apparatus is positioned at a pull-in position.

In contrast, in order to move the front-end portion 51 of the cushion body 5 from the pull-in position G to the pull-out position E, in contrast to the aforementioned operation, the sector gear 62 is rotated in the clockwise direction shown in FIG. 6 by an operation of the driving mechanism 63. Further, by adjustments to the degree to which the driving mechanism 63 is operated, the front-end portion 51 of the cushion body 5 can be arbitrarily positioned between the pull-in position G and the pull-out position E.

According to the embodiment of the present invention, when, in order to swing the arm, the link bracket is moved by means of the rotation of the gear member in the longitudinal direction of the seat, the link bracket rotates relative to the second bracket around the shaft extended in the longitudinal direction. In other words, in response to looseness, in the width direction, between a connecting point of the second end of the link bracket relative to the arm and a bearing point of the first end of the link bracket, through the first bracket and the second bracket, relative to the gear member, the link bracket rotates around the shaft extended in the longitudinal direction relative to the second bracket. Therefore, problems such as torsion in the link bracket can be resolved and a reliable and smooth operation of the arm can thereby be ensured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle seat apparatus comprising:
   a cushion body provided on a frame member;
   a seat cushion, a seating surface of which is formed by the cushion body;
   a gear member rotatably supported at the frame member;
   a driving mechanism supported at the frame member and connected to the gear member so as to rotate the gear member;
   an arm swingably supported at the frame member and connected to a front-end portion of the cushion body; and
   a link mechanism comprising:
      a first bracket rotatably supported at the gear member around a shaft extended in a direction of a rotation center of the gear member;
      a second bracket rotatably supported at the first bracket around a shaft extended substantially perpendicular to a rotation center of the first bracket; and
      a link bracket, a first end of which is rotatably supported at the second bracket around a shaft extended substantially perpendicular to a rotation center of the second bracket, and a second end of which is connected to the arm, wherein
   the arm is connected to the gear member through the link mechanism, and
   with an up-and-down operation of the front-end portion of the cushion body relative to the frame member by means of a swing of the arm, a length of the seating surface is variable in a longitudinal direction.

2. The vehicle seat apparatus according to claim 1, wherein the first bracket, being a substantially U-shaped cross section, includes a first base wall and a, right and left, pair of first vertical walls extended from first and second ends of the first base wall, and by means of a first pin extended in the direction of the rotation center of the gear member, the first base wall is rotatably supported at the gear member.

3. The vehicle seat apparatus according to claim 2, wherein the second bracket, being a substantially U-shaped cross section, includes a second base wall and a, right and left, pair of second vertical walls extended from first and second ends of the second base wall, and
by means of a second pin extended substantially perpendicular to the rotation center of the first bracket, the second base wall is rotatably supported at the first bracket.

4. The vehicle seat apparatus according to claim 3, wherein the second pin is fixed at the pair of the first vertical walls.

5. The vehicle seat apparatus according to claim 1, wherein the second bracket, being a substantially U-shaped cross section, includes a base wall and a, right and left, pair of second vertical walls extended from first and second ends of the base wall, and
by means of a second pin extended substantially perpendicular to the rotation center of the first bracket, the base wall is rotatably supported at the first bracket.

6. The vehicle seat apparatus according to claim 5, wherein the link bracket, being a substantially U-shaped cross section, includes a link base wall and a, right and left, pair of link vertical walls extended from first and second ends of the link base wall, and
by means of a link pin extended substantially perpendicular to the rotation center of the second bracket, the link base wall is rotatably supported at the second bracket.

7. The vehicle seat apparatus according to claim 6, wherein the link pin is fixed at the pair of second vertical walls.

8. The vehicle seat apparatus according to claim 1, wherein
the link bracket, being a substantially U-shaped cross section, includes a link base wall and a, right and left, pair of link vertical walls extended from first and second ends of the link base wall, and
by means of a link pin extended substantially perpendicular to the rotation center of the second bracket, the link base wall is rotatably supported at the second bracket.

9. The vehicle seat apparatus according to claim 1, further comprises:
a supporting bracket fixed to the arm; and
a third bracket which is attached to the supporting bracket and rotably supports an end of the supporting bracket around a shaft extended substantially perpendicular to a rotation center of the link bracket.

10. The vehicle seat apparatus according to claim 9, wherein
the third bracket, being a substantially U-shaped cross section, includes a third base wall and a, right and left, pair of third vertical walls extended from first and second ends of the third base wall, and
by means of a third pin extended substantially perpendicular to the rotation center of the link bracket, the third base wall is rotatably supported at the second bracket.

11. The vehicle seat apparatus according to claim 10, wherein
the link bracket, being a substantially U-shaped cross section, includes a link base wall and a, right and left, pair of link vertical walls extended from first and second ends of the link base wall, and
by means of a link pin extended substantially perpendicular to the rotation center of the second bracket, the link base wall is rotatably supported at the second bracket.

12. The vehicle seat apparatus according to claim 11, wherein the third pin is fixed at the pair of link vertical walls.

* * * * *